June 24, 1969  R. GREENE  3,451,781
MANURE DRYER UNIT
Filed Oct. 18, 1965
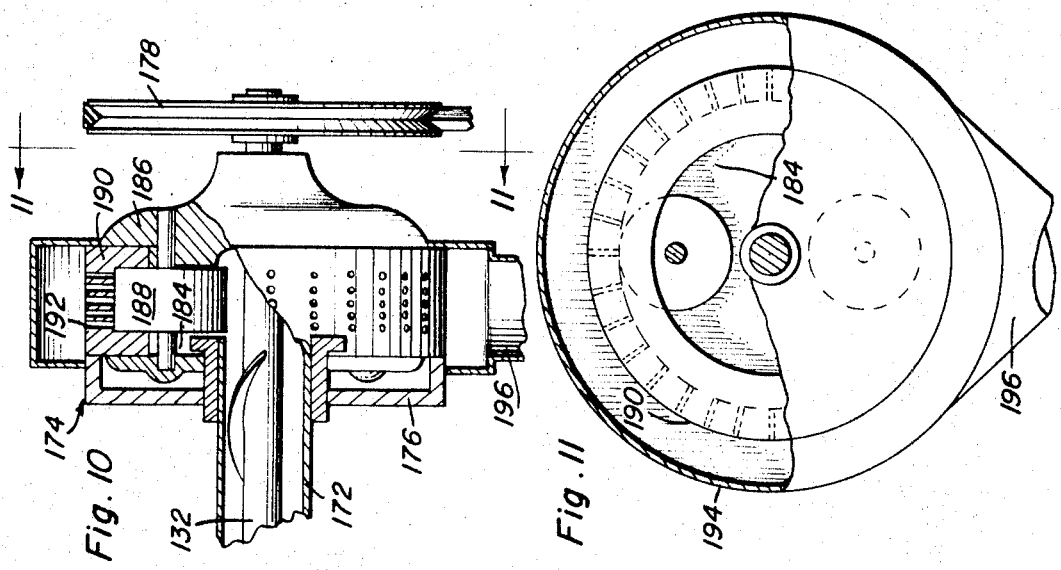
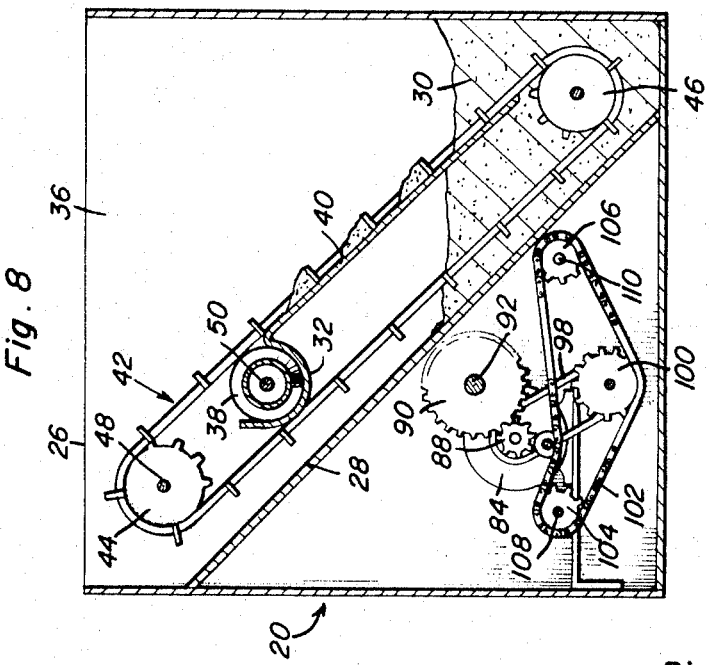
Richard Greene
INVENTOR.

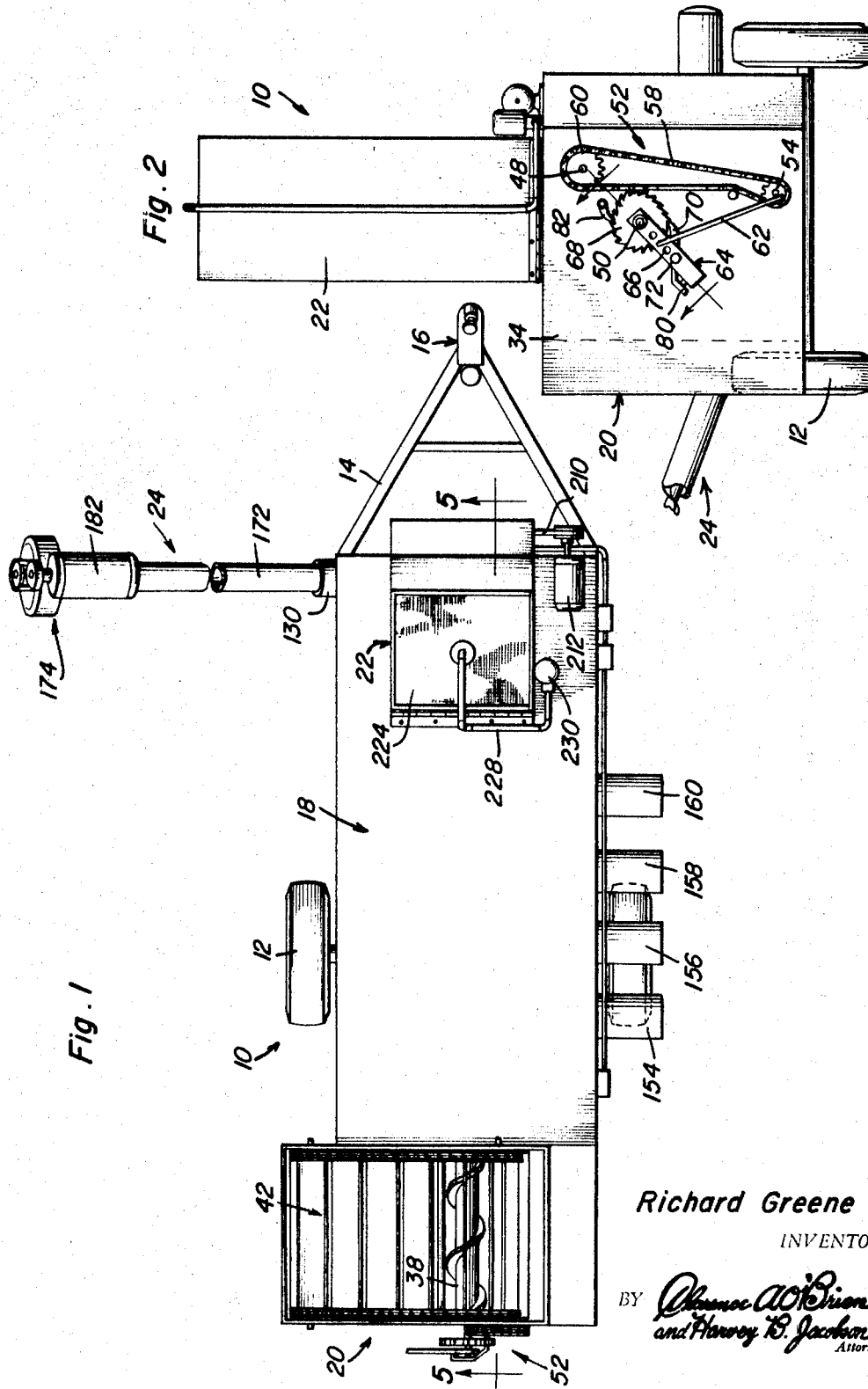

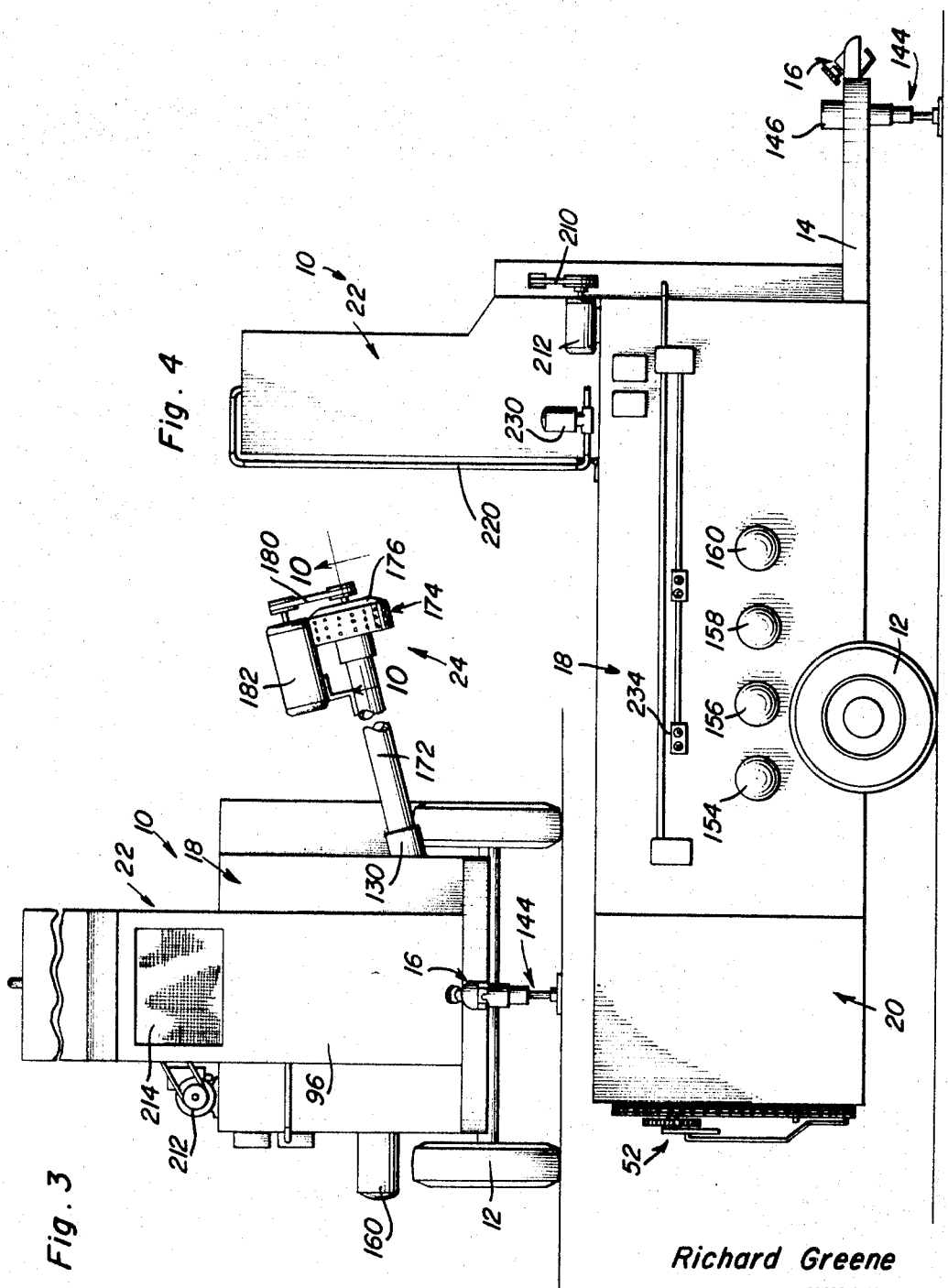

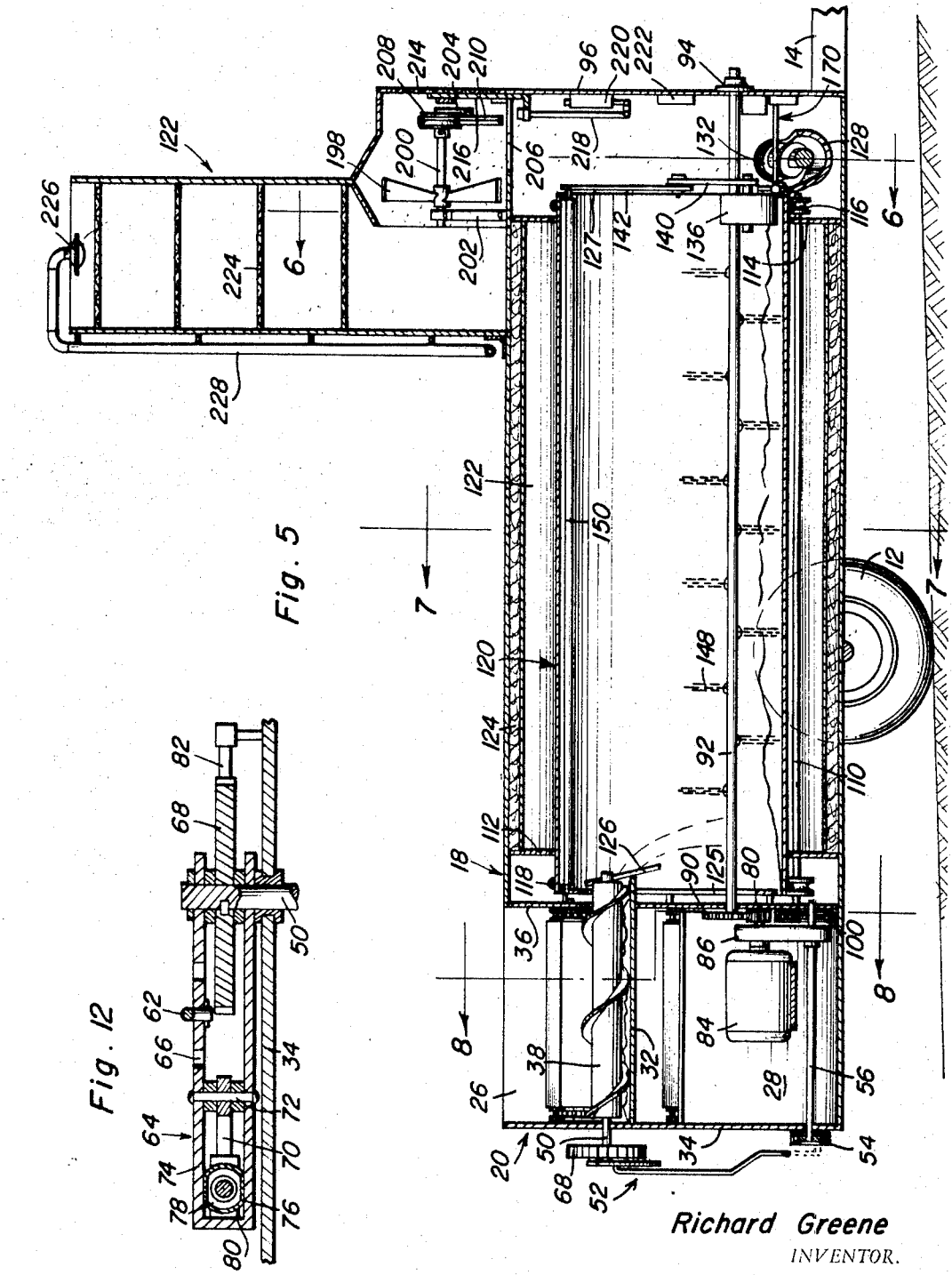

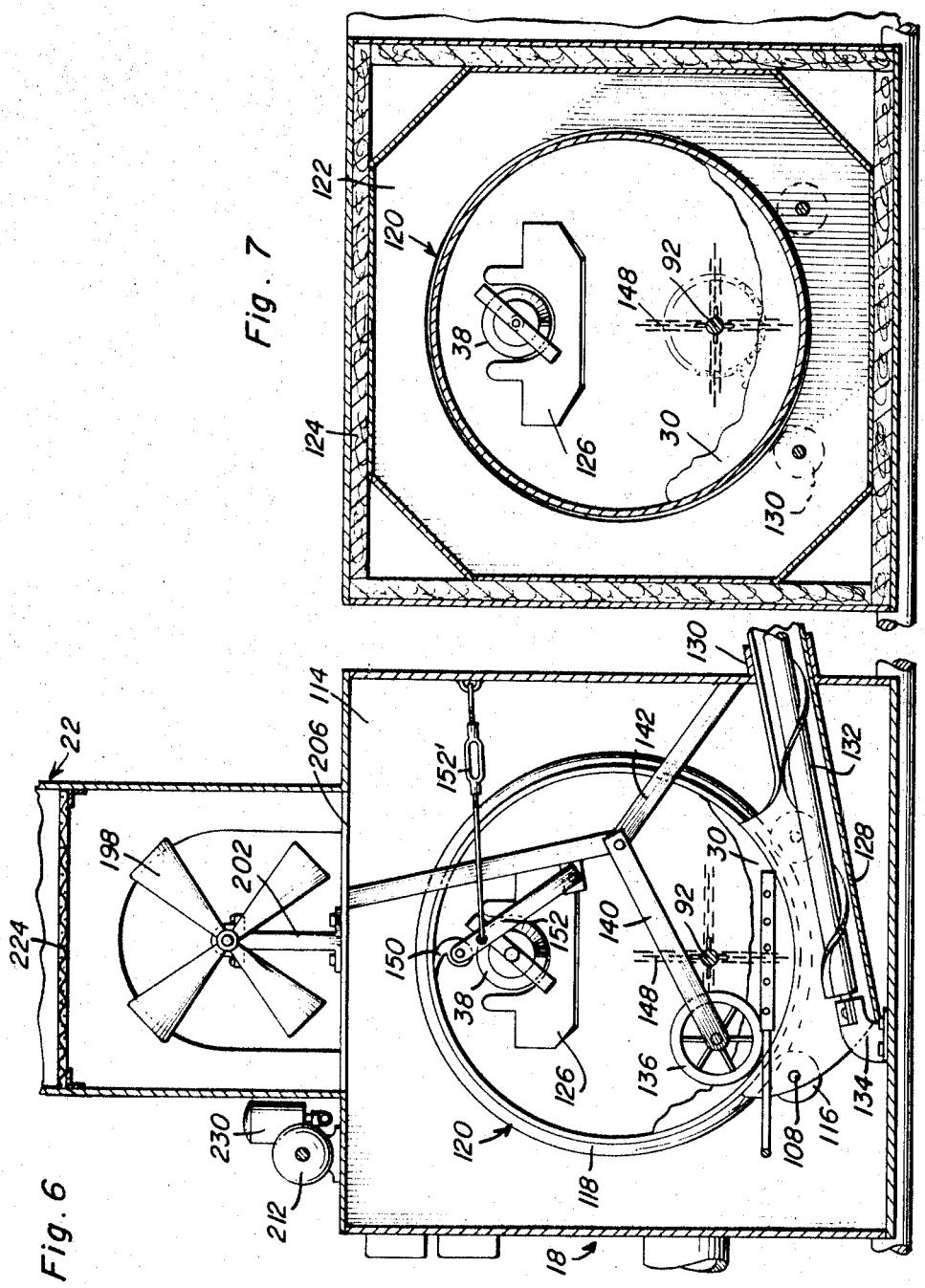

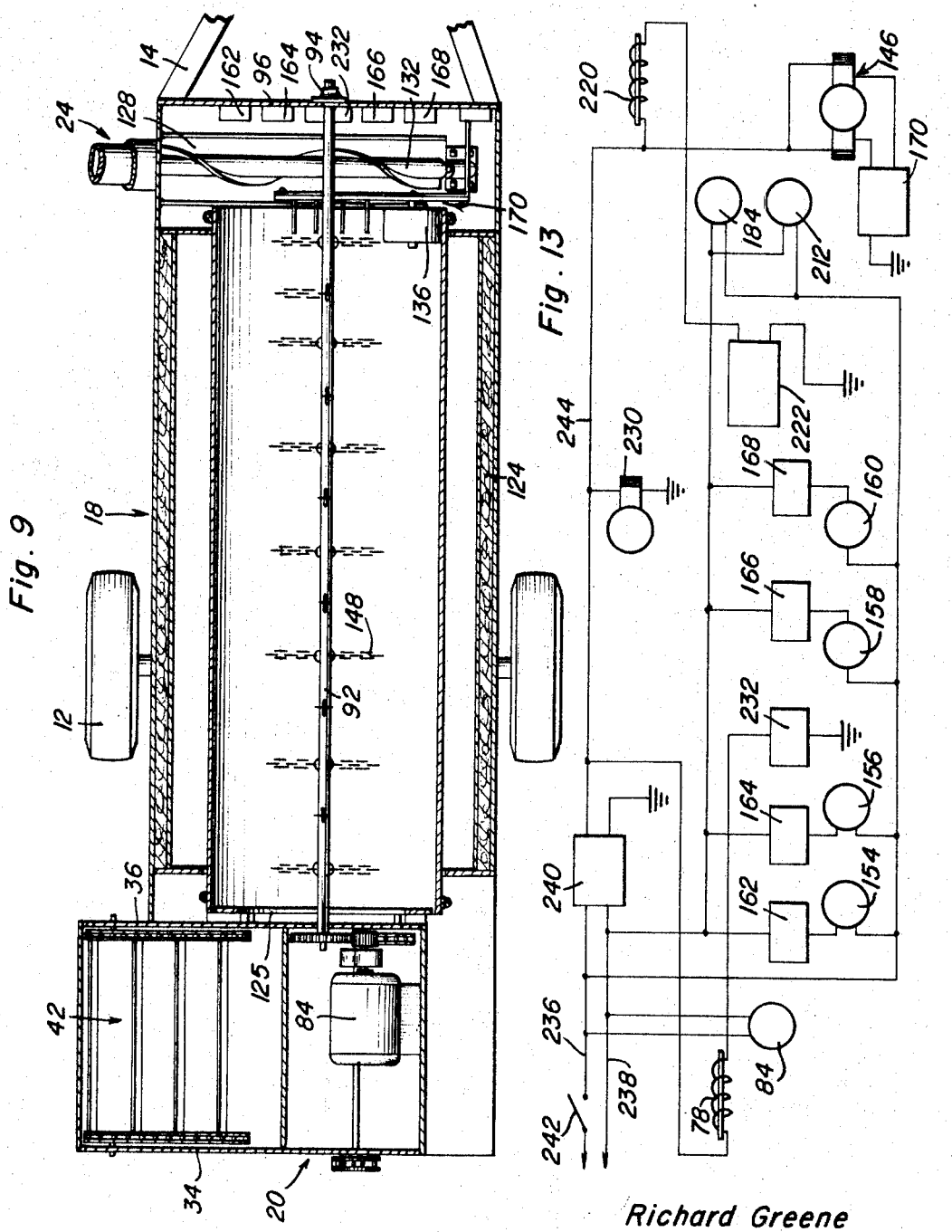

United States Patent Office 3,451,781
Patented June 24, 1969

3,451,781
MANURE DRYER UNIT
Richard Greene, 30 Park St., Spencer, N.Y. 14883
Filed Oct. 18, 1965, Ser. No. 497,372
Int. Cl. C05f 3/06
U.S. Cl. 23—259.1
15 Claims

ABSTRACT OF THE DISCLOSURE

A mobile drying unit for converting wet manure into a dry, pelletized fertilizer. The manure is controllably fed from a hopper into one end of a tumbler rotated about an axis, the inclination of which is varied in accordance with the moisture content of the material discharged from the lower end of the tumbler. The material is agitated and heated as it progresses through the tumbler while volatiles are removed by a forced draft at the discharge end of the tumbler. The solid residue of the manure is then conveyed to a pelletizer.

---

This invention relates to the handling and treatment of materials such as wet manure and to apparatus for drying such material in order to produce a relatively dry and marketable product particularly useful as a fertilizer.

It is therefore a primary object of the present invention to provide apparatus which will receive and automatically convert wet manure, obtained for example from barns and poultry houses, into a relatively dry solid fertilizer in pelletized form.

An additional object of the present invention is to provide an apparatus for converting relatively wet manure into a dry fertilizer having a uniform and low moisture content. The efficiency with which the raw material is converted into the fertilizer product by the apparatus of the present invention will thereby not only solve a disposal problem in connection with the raw material being treated but will also create an asset therefrom.

An additional object of the present invention in accordance with the foregoing objects, is to provide apparatus for treating manure without producing any noxious exhaust.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of one form of apparatus constructed in accordance with the present invention.

FIGURE 2 is a rear elevational view of the apparatus shown in FIGURE 1.

FIGURE 3 is a front elevational view of the apparatus.

FIGURE 4 is a side elevational view of the apparatus.

FIGURE 5 is a side sectional view of the apparatus taken substantially through a plane indicated by section line 5—5 in FIGURE 1.

FIGURE 6 is a partial sectional view taken substantially through a plane indicated by section line 6—6 in FIGURE 5.

FIGURE 7 is a transverse sectional view taken substantially through a plane indicated by section line 7—7 in FIGURE 5.

FIGURE 8 is a transverse sectional view taken substantirally through a plane indicated by section line 8—8 of FIGURE 5.

FIGURE 9 is a top sectional view of the apparatus shown in FIGURES 1 through 4.

FIGURE 10 is an enlarged partial sectional view taken substantially through a plane indicated by section line 10—10 of FIGURE 3.

FIGURE 11 is a sectional view taken substantially through a plane indicated by section line 11—11 in FIGURE 10 with parts broken away and shown in section.

FIGURE 12 is an enlarged partial sectional view taken substantially through a plane indicated by section line 12—12 in FIGURE 2.

FIGURE 13 is an electrical circuit diagram of the control system associated with the apparatus of the present invention.

Referring now to FIGURES 1 through 4, the illustrated embodiment of the invention generally denoted by reference numeral 10, is conveniently supported above the ground by a vehicle trailer frame rotatably mounting a pair of supporting wheels 12 spaced rearwardly from a hitch assembly 14. Accordingly, the apparatus is rendered mobile so that it may be moved from one location to another by means of a towing vehicle (not shown) adapted to be connected to the coupling mechanism 16 at the forward end of the hitch assembly 14. It will of course be appreciated, that the apparatus could be mounted at a fixed location on some other suitable supporting frame. The supporting frame in any case, will mount a main housing section which is horizontally elongated and within which the various components of the apparatus are enclosed. An inlet hopper section 20 is secured to one end of the housing section 18 at the rear end of the trailer vehicle frame while a vertically extending exhaust flue section 22 is connected to the housing section 18 adjacent the forward end of the trailer vehicle frame. Also extending laterally at an upward incline from the housing section 18 at the forward end, is a product delivery section generally referred to by reference numeral 24. It will therefore become apparent, that the raw material in the form of wet manure may be supplied to the inlet hopper section 20 of the apparatus and a relatively dry fertilizer product in pellet form will be delivered from the delivery section 24. Waste products in the form of deodorized exhaust gas will at the same time emerge from the exhaust flue section 22.

Referring now to FIGURES 2, 5, 8 and 9 in particular, it will be observed that the hopper section has an open upper end 26 into which the raw material in the form of a relatively wet manure is loaded. As shown in FIGURE 8, the inlet hopper section is provided with an internal, downwardly sloping bottom wall 28 above which the manure 30 is confined. A substantially horizontal feeding trough is supported between the rear and front walls 34 and 36 of the hopper section 20 and extends through an opening in the front wall 36 into the housing section 18. Rotatably mounted within the feeding trough 32, is an auger device 38 for feeding the material 30 from the hopper section 20 into the housing section 18. The feeding trough 32 and auger conveyor 38 extending therethrough are disposed above the inclined bottom wall 28 of the hopper section between the upper and lower runs at an endless conveyor belt 40 of a continuously driven circulating conveyor generally referred to by reference numeral 42. The conveyor belt 40 is therefore entrained about a pair of upper sprocket wheels 44 rotatably mounted between the walls 34 and 36 of the hopper section adjacent the open upper end 26 while a pair of lower sprocket wheels 46 engage the conveyor belt adjacent the bottom of the hopper section, the sprocket wheels 46 also being rotatably mounted between the walls 34 and 36. The upper sprocket wheels 44 are connected to a drive shaft 48 which extends rearwardly from the rear wall 34 of the hopper section so that the circulating conveyor 42 may be continuously driven in order to displace material 30 upwardly along the upper run of the belt 40 into the feeding trough 32. The auger device 38 on the other hand is connected to a drive shaft 50 which also extends rearwardly through the wall 34 so that the material deposited within the feeding trough 32 may be controllably fed into the main housing section 18 by the auger device. The circulating conveyor 42 and the feeding auger 38 are driven by means of a drive mechanism generally referred to by reference numeral 52 mounted on the outside of the rear wall 34 of the inlet hopper section as more clearly seen in FIGURE 2.

The drive mechanism 52 includes a drive sprocket gear 54 connected to the rearward end of an input shaft 56 that extends forwardly into the hopper section below the internal bottom wall 28 as shown in FIGURES 5 and 8. The drive sprocket 54 is drivingly connected to the drive shaft 48 associated with the circulating conveyor 42 by means of an endless sprocket chain 58 entrained about a sprocket wheel 60 secured to the drive shaft 48 on the outside of the rear wall 34, as shown in FIGURE 2. The circulating conveyor 42 is thereby continuously driven when powered rotation is imparted to the sprocket 54 secured to the end of input shaft 56. Also connected to the drive sprocket 54 by means of a crankpin offset from the rotational axis of the input shaft 56, is a connecting rod 62. The upper end of the connecting rod 62 is pivotally connected to an oscillating lever assembly 64 in order to impart oscillatory movement thereto about a fixed axis established through the drive shaft 50 associated with the feeding auger 38. The oscillatable lever 64 is therefore provided with a plurality of spaced apertures 66 within which the upper end of the connecting rod 62 is received so that the oscillatory stroke of the lever 64 may be adjusted. Fixedly mounted on the rear end of the drive shaft 50 as more clearly seen in FIGURE 12, is a ratchet wheel 68 adapted to be engaged by the driving end of a pawl element 70 pivotally mounted on the lever 64 by means of the pivot pin 72. The lever assembly 64 includes a pair of interconnected lever arms 74 and 76 which are rotatably mounted on the drive shaft 50 in straddling relation to the ratchet wheel 68. Fixedly mounted between the lever arms 74 and 76 at an end remote from the ratchet wheel 68 is a solenoid device 78 adapted to be energized in order to disengage the driving pawl element 70 from the ratchet wheel. Accordingly, the driving pawl 70 is provided with an end portion 80 overlying the solenoid device 78 so that energization of the solenoid device will pivotally displace the driving pawl in a clockwise direction as viewed in FIGURE 2 in order to disengage the ratchet wheel. When the solenoid device is deenergized however, the driving pawl will be in engagement with the ratchet wheel so as to intermittently rotate the drive shaft 50 in one direction upon oscillation by the connecting rod 62 in response to rotation of the drive sprocket 54. A holding pawl 82 is pivotally mounted on the wall 34 and engages the teeth on the ratchet wheel 68 so as to prevent reverse rotation thereof. It will therefore be apparent, that while the circulating conveyor is continuously driven through the drive shaft 48, the feeding auger 38 is driven intermittently under control of the solenoid device 78.

Power for operating the drive mechanism 52 is derived from an electric motor 84 protectively mounted within the inlet hopper section 20 below the bottom wall 28. The motor shaft of the motor 84 is drivingly connected by a reduction gear unit 86 to the input shaft 56. Also connected to the motor shaft, is a drive pinion 88 in constant mesh with a driven gear wheel 90. The driven gear wheel 90 is connected to an agitator shaft 92 which projects rearwardly through the wall 36 from the housing section 18. The agitator shaft 92 is therefore rotatably supported at its forward end by means of a bearing assembly 94 on the forward wall 96 of the exhaust section 22 as shown in FIGURES 5 and 9. The motor shaft of motor 84 is also drivingly connected by means of a sprocket chain 98 to a sprocket gear 100 rotatably mounted on the wall 36 as more clearly seen in FIGURE 8. An endless sprocket chain 102 is enrtained about the sprocket gear 100 and a pair of driven sprocket wheels 104 and 106 to which a pair of drive shafts 108 and 110 are connected. Each of the shafts 108 and 110 extend through the wall 36 forwardly into the housing section 18 and are supported between end walls 112 and 114 respectively, spaced from and adjacent to the walls 36 and 96 as shown in FIGURE 5.

Each of the drive shafts 108 and 110 have connected thereto adjacent the forward and rear ends, friction drive wheels 116 that frictionally engage annular rims 118 formed adjacent the opposite axial ends of an enlarged cylindrical tumbler generally referred to by reference numeral 120. The drive wheels 116 are engaged with the rims 118 of tumbler 120 in circumferentially spaced relation to each other to rotationally support the tumbler for rotation about a longitudinal axis. As shown in FIGURE 5, the tumbler projects axially beyond the end walls 112 and 114 a short distance so that the major portion of the tumbler will be disposed within an insulated chamber 122 formed within the housing section 18. Accordingly, an insulating wall 124 is formed within the housing section 18 between the end walls 112 and 114. The rear inlet end 125 of the tumbler 120 is disposed between the walls 36 and 112 so that material may be deposited by the deflector 126 from the unloading end of the feeding trough 32 into the tumbler. The forward discharge end 127 of the tumbler on the other hand is disposed between the walls 114 and 96. Fixedly mounted adjacent the bottom of the main housing at the discharge end of the tumbler, is a delivery trough 128 associated with the delivery section 24. Accordingly, the delivery trough 128 extends at an upward inclination from the bottom wall of the exhaust section 22 and out one side thereof through the outlet opening 130 as more clearly seen in FIGURE 6. Material discharged from the tumbler at the forward end thereof will therefore be deposited into the delivery trough 128 and conveyed outwardly by means of a delivery auger 132 rotatably mounted at an inlet end by the journal bracket 134.

The friction drive wheels 116 which engage the annular rims 118 adjacent the forward and rear ends of the tumbler 120, not only provide rotational support for the tumbler but also impart rotation thereto when rotated upon energization of the motor 84 as aforementioned. The tumbler is maintained therefore in driving engagement with the drive rollers 116 by means of a pressure wheel 136 rotatably mounted on a lever element 140 as more clearly seen in FIGURE 6. The lever element 140 is therefore pivotally mounted in proper position by a supporting frame 142 secured to the walls of the exhaust section adjacent to the end wall 114. It will therefore be apparent, that rotation of the tumbler 120 will maintain the material supplied thereto in a state of motion in order to facilitate gravity induced flow thereof from the rear inlet end of the tumbler to the forward discharge end thereof. The trailer frame is therefore supported at a downward incline by a hydraulically adjustable support mechanism 144 mounted by the hitch assembly 14 as shown in FIGURE 4. A solenoid operated control valve assembly 146 is associated with the support mechanism 144 so that the inclination of the longitudinal axis of the tumbler 120 may be varied in order to regulate the gravity induced flow rate of material through the tumbler as it is rotating.

While the tumbler 120 is being rotated about its longitudinal axis, the agitator shaft 92 is also being rotated in order to render the flexible flailing chains 148 operative to beat and agitate the material within the tumbler. In this way, the material is conditioned for more rapid and complete drying as well as to enhance the removal of moisture therefrom. The flailing chains are therefore secured in longitudinally spaced relation to each other to the agitator shaft 92 between the inlet and discharge ends of the tumbler through which the agitator shaft extends.

Also mounted in engagement with the internal surface of the tumbler is a scraper blade 150. As more clearly seen in FIGURE 6, the scraper blade is adjustably mounted in fixed position by means of the arm 152 pivotally connected to the supporting frame 142 and to an adjustable turnbuckle device 152' interconnecting the arm 152 to the housing. Thus, any of the material clinging to the wall of the tumbler will be displaced therefrom for return to the bottom of the tumbler and the agitating action of the flailing chains 148.

As shown in FIGURES 1 and 4, a plurality of heater assemblies 154, 156, 158 and 160 are mounted on the housing section 18 and project laterally from one vertical side wall thereof. Any suitable heater assembly may be selected for this purpose including an electrically operated blower means. The heating assemblies are however so mounted on the vertical side wall of the housing section 18 that they will be effective to elevate the temperature within the insulated chamber 122 encircling the tumbler 120 as shown in FIGURES 5, 7 and 9. The tumbler is therefore made of a heat-conductive material so that the manure being conveyed therethrough will be subjected to the drying action of the heat which will be retained within the heating chamber 122 by the insulated walls 124. The heating assemblies may be sequentially deenergized in order to maintain a predetermined temperature within the housing section 18 and toward this end, the heating assemblies are respectively associated with temperature sensing devices 162, 164, 166 and 168 suitably mounted for example on the front wall 96 of the housing section as shown in FIGURE 9. Also mounted on the front wall and projecting into the material being discharged from the forward discharge end of the tumbler, is a moisture-sensing device 170. Thus, the temperature sensing thermostat devices 162, 164, 166 and 168 are operative to control operation of the heating assemblies while the moisture-sensing device 170 is operative to regulate the gravity-induced flow rate through the control valve assembly 146 aforementioned in order to obtain a product having a predetermined uniform moisture content. For example, the moisture content of the fertilizer product obtained through use of the apparatus of the present invention is approximately 10% to 12% as compared to the 70% to 80% moisture content of the manure supplied to the inlet hopper section. A uniform product is therefore discharge from the forward discharge end of the tumbler 120 and deposited within the delivery trough 128 for removal from the exhaust section by means of the delivery auger 132.

As shown in FIGURES 3, 11 and 10, the delivery trough 128 is connected to a delivery conduit 172 through which the delivery auger 132 extends. The delivery conduit 172 is connected at its upper end to a pelletizing mechanism 174. The pelletizing mechanism includes a housing assembly 176 which journals the upper end of the delivery auger 132 to which the pulley wheel 178 is connected. The pulley wheel is drivingly connected by the endless belt 180 to an output pulley on the shaft of an electric motor 182 fixedly mounted between the housing assembly 176 and the delivery conduit 172. The housing assembly 176 forms a closed annular chamber 184 into which the delivery auger 132 displaces and compresses the dried manure. A rotor 186 is connected to the auger 132 for rotation therewith and rotatably mounts a presser wheel 188 in offset relation to the rotational axis of the auger 132 within the chamber 184. The presser wheel 188 is caused to roll about the internal surface of an annular die member 190 fixed to the housing assembly 176 so that the dried manure will be compressed and forced through the die holes 192 in order to convert the dried manure into pellet form. The pelletized product discharged from the annular die member 190 is therefore received within an annular hood 194 which encloses the die member 190, the hood being provided with an outlet spout 196 in order to deliver the pelletized end product to any suitable container (not shown).

While the manure is being dried within the tumbler 120, moisture-laden exhaust gas released from the material being dried is withdrawn by means of an exhaust fan 198 connected to a fan shaft 200 rotatably mounted between the journal brackets 202 and 204 as more clearly seen in FIGURES 5 and 6. The exhaust fan 198 is therefore mounted above the outlet opening 206 adjacent the forward end of the tumbler in order to withdraw the exhaust gases therefrom. The fan shaft 200 is therefore provided with a pulley wheel 208 about which an endless belt 210 is entrained for drivingly connecting the fan shaft to a fan motor 212 fixedly mounted on top of the housing section 18 adjacent the forward end thereof. The forward end wall 96 extends upwardly above the outlet opening 206 and is formed with an air inlet opening mounting a screen 214 through which a controlled volume of air may be drawn in by the exhaust fan 198 in order to regulate the outflow of exhaust gas and the mixture thereof with air. Toward this end, a baffle plate 216 is slidably mounted on the wall 96 in order to regulate the effective dimension of the air inlet opening. The baffle plate is connected by a damper control rod 218 to a damper control solenoid 220. Associated with the damper control solenoid 220, is a moisture-sensing device 222 also mounted on the front wall 96 so that the outflow through the outlet opening 206 may be regulated in accordance with the moisture content of the exhaust gases exiting from the discharge end of the tumbler 120.

It will therefore be apparent, that the exhaust fan 198 produces a forced flow of exhaust gases upwardly through the exhaust flue section 122. Mounted within the flue section 122 above the exhaust fan are a plurality of vertically spaced screens 224 through which the exhaust gases must pass. While passing upwardly through the screens 224, the exhaust gas is subjected to a water spray from the spray head 226. In this manner, the exhaust gas is washed and the noxious, odor producing constituents condensed. The spray head 226 is connected to a source of water under pressure through conduit 228, water being admitted to the conduit 228 upon energization of the solenoid operated valve device 230.

As shown in FIGURE 4, electrical energy for operating the various motors, solenoid devices, solenoid operated valves, thermostat control devices and moisture-sensing devices, may be supplied from any available source plugged into one of the receptacles 234 mounted above the heater assemblies. Thus, the heating assemblies are initially rendered operative to elevate the temperature of the heating chamber 122 before any material is fed to the tumbler. When the temperature within the insulated chamber has reached a desired value as sensed by thermostat device 232 (FIGURE 9) mounted on the front wall 96, material from the inlet hopper section is fed to the tumbler. As the temperature rises, the heater assemblies are sequentially deenergized in order to maintain a predetermined temperature level. At the same time that material is fed into the tumbler, rotation is imparted to the tumbler and to the agitator shaft 92 to induce flow and agitate the material. Also, the moisture-sensing devices 170 and 222 are rendered operative to respectively maintain a constant moisture content in the dry manure discharged from the tumbler and to regulate the volumetric outflow of exhaust gases. A control system such as illustrated in FIGURE 13 may therefore be utilized in order to execute the foregoing operational sequence.

As shown in FIGURE 13, an A.C. source of electrical energy may be supplied by the powerlines 236 and 238 to a voltage rectifier 240 upon closing of the power switch 242. D.C. energizing current from the rectifier may therefore be supplied by the D.C. voltage line 244 to the solenoid operated control valve 230 for supplying water under pressure to the spray head 226. The D.C. voltage line 234 is also connected to the damper control solenoid 220 for regulating the inflow of air in accordance with the moisture content of the exhaust gases as detected by the moisture-sensing device 222. Thus, an energizing circuit will be completed through the damper control solenoid 220 by the moisture-sensing device 222 when a predetermined moisture content in the exhaust gas is detected, to close the air inlet opening so that a greater volume of exhaust gas may be withdrawn by the exhaust fan. The D.C. voltage line 244 is also connected to bi-directional valve assembly 146 in order to vary the inclination of the tumbler 120 for varying the gravity-induced flow rate of the material therethrough. The control valve assembly 146 is therefore connected to the moisture-sensing device 170 through which the inclination of the tumbler is varied in accordance with the moisture content of the material at the discharge end of the tumbler. Finally, the D.C. voltage line 244 is connected to the drive disengaging solenoid 78 through which a circuit is completed by means of the thermostat device 232. The thermostat device 232 will therefore complete an energizing circuit through the solenoid 78 in order to disengage the drive mechanism 52 preventing the feeding of material into the tumbler until the temperature as sensed by the thermostat device 232 has risen to a predetermined minimum value.

The drive motor 84, the fan motor 212 and the pelletizing motor 184 are all connected in parallel to the A.C. powerlines 236 and 238 for continuous energization, thereof when the apparatus is operating. The drive motor 84 will therefore be continuously operative to rotate the tumbler 120 and operate the agitator shaft 92 while the product delivery section 24 and the exhaust section 22 will be continuously operated by the motors 184 and 212 respectively. The heater assemblies 154, 156, 158 and 160 on the other hand will be operated from the A.C. powerlines under control of the respective thermostat devices 162, 164, 166 and 168 each connected in series with an associated heater between the A.C. powerlines. The latter mentioned thermostat devices will therefore sequentially denergize the heating devices with which they are respectively associated in order to maintain a predetermined temperature within the heating chamber for drying the material passing through the tumbler.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. Apparatus for converting relatively moist manure into a relatively dry, particulate fertilizer comprising, an axially elongated tumbler having an inlet end and a discharge end, means controllably feeding said manure into the tumbler at said inlet end, means for rotating the tumbler about an inclined rotational axis to maintain said manure in a gravity induced flowing condition, agitating means rotatable within said tumbler about an axis spaced below the inclined rotational axis of the tumbler for agitating the manure, heating means mounted in heat conductive relation to the tumbler for drying the manure within the tumbler, forced flow inducing means operatively mounted adjacent to the discharge end of the tumbler for removal of moisture laden gases therefrom and means mounted at said discharge end of the tumbler for pelletizing a solid residue of said manure received therefrom.

2. The combination of claim 1 including flow regulating means operatively positioning the tumbler at a variable inclination to vary the gravity induced flow rate of the material through the tumbler, and moisture control means operatively connected to the flow regulating means for varying said flow rate in order to maintain a constant moisture content in the solid residue discharged from the tumbler.

3. The combination of claim 2 wherein said delivery means comprises, an auger device mounted in operative relation to the tumbler, a pelletizing mechanism connected to the auger device, and power operated drive means connected to the auger device for displacing said solid residue through the pelletizing mechanism.

4. The combination of claim 3 including exhaust flow washing means mounted in operative relation to the forced flow including means for removal of solid particles from the gases.

5. Apparatus for converting relatively moist material into relatively dry, particulate product comprising, an auxiliary alongated tumbler having an inlet end and a discharge end, means controllably feeding said material into the tumbler at said inlet end for gravity induced flow toward said discharge end, means for rotating the tumbler to maintain said material in a flowing condition, means responsive to rotation of said tumbler for agitating the material therein, heating means mounted in heat conductive relation to the tumbler for drying the material within the tumbler, forced flow inducing means operatively mounted adjacent to the discharge end of the tumbler for removal of moisture laden gases therefrom and delivery means mounted at said discharge end of the tumbler for receiving a solid residue of said material, said means for rotating the tumbler comprising, spaced drive rollers externally supporting the tumbler for rotation, means engageable with the tumbler adjacent the discharge end for yieldably holding the same in contact with said drive rollers, and a drive motor drivingly connected to the rollers at the inlet end of the tumbler for imparting rotation thereto.

6. The combination of claim 5 wherein said agitating means comprises, an agitator shaft rotatably mounted about an axis extending through the tumbler below the rotational axis of the tumbler, a plurality of longitudinally spaced flailing elements secured to the agitator shaft between the inlet and discharge ends of the tumbler, and means drivingly connecting said agitator shaft to the drive motor.

7. Apparatus for converting relatively moist material into a relatively dry, particulate product comprising, an axially elongated tumbler having an inlet end and a discharge end, means controllably feeding said material into the tumbler at said inlet end for gravity induced flow toward said discharge end, means for rotating the tumbler to maintain said material in a flowing condition, means responsive to rotation of said tumbler for agitating the material therein, heating means mounted in heat conductive relation to the tumbler for drying the material within the tumbler, forced flow inducing means operatively mounted adjacent to the discharge end of the tumbler for removal of moisture laden gases therefrom and delivery means mounted at said discharge end of the tumbler for receiving a solid residue of said material, said controllable feeding means comprising, a hopper containing said material, a supply conveyor mounted within the hopper and extending into the inlet end of the tumbler, circulating conveyor means continuously driven for loading the supply conveyor with said material, disengageable drive means for unloading said material into the tumbler, and thermal control means operatively connected to the disengageable drive means for preventing operation of the supply conveyor until a minimum temperature is developed within the tumbler by the heating means.

8. The combination of claim 7 wherein said delivery means comprises, an auger device mounted in operative relation to the tumbler, a pelletizing mechanism connected to the auger device, and power operated drive means connected to the auger device for displacing said solid residue through the pelletizing mechanism.

9. The combination of claim 7 wherein said agitating means comprises, an agitator shaft rotatably mounted about an axis extending through the tumbler below the rotational axis of the tumbler, and a plurality of longitudinally spaced flailing elements secured to the agitator shaft between the inlet and discharge ends of the tumbler.

10. Apparatus for converting relatively moist material into a relatively dry, particulate product comprising, a frame, a tumbler rotatably mounted on the frame for rotation about a longitudinal axis, said tumbler having an inlet end and a discharge end, means controllably feeding said material into the tumbler at said inlet end for gravity induced flow toward said discharge end, means for rotating the tumbler to maintain said material in a flowing condition, means responsive to rotation of said tumbler for agitating the material therein, heating means mounted in heat conductive relation to the tumbler for drying the material within the tumbler, delivery means mounted at said discharge end of the tumbler for receiving a solid residue of said material, flow regulating means operatively controlling the inclination of the tumbler to vary the gravity induced flow rate of the material through the tumbler, and moisture control means projecting into the tumbler at the discharge end and operatively connected to the flow regulating means for varying said inclination of the tumbler in order to maintain a constant moisture content in the solid residue discharged from the tumbler.

11. The combination of claim 10 wherein said means for rotating the tumbler comprises, spaced drive rollers externally supporting the tumbler for rotation, means engageable with the tumbler adjacent the discharge end for yieldably holding the same in contact with said drive rollers, and a drive motor drivingly connected to the rollers at the inlet end of the tumbler for imparting rotation thereto.

12. The combination of claim 10 wherein said agitating means comprises, an agitator shaft rotatably mounted by the frame and extending through the tumbler below the longitudinal axis of the tumbler, and a plurality of longitudinally spaced flailing elements secured to the agitator shaft between the inlet and discharge ends of the tumbler.

13. A mobile drying apparatus comprising a vehicle frame having opposite longitudinal ends, a tumbler mounted by the frame between said ends for rotation about a rotational axis, wheel means supporting the frame intermediate said ends, adjustable support means mounted by the frame adjacent one of the ends for positioning the rotational axis at a downward incline from the other of the ends to said one of the ends of the frame, a hopper mounted by the frame adjacent said other of the ends, means for controllably feeding material from the hopper to the tumbler about said rotational axis, means for agitating material below said rotational axis of the tumbler in response to rotation thereof, and means extending laterally from the frame for pelletizing material discharged from the tumbler adjacent said one of the ends of the frame.

14. The combination of claim 13 including moisture sensing means mounted by the frame adjacent said one of the ends projecting into the tumbler for contact with the material being discharged therefrom, and means connecting the sensing means to the adjustable support means for changing the inclination of the rotational axis of the tumbler in response to variations in the moisture content of the material being discharged from the tumbler.

15. In a drying apparatus, a frame having opposite longitudinal ends, a tumbler mounted by the frame for rotation about a rotational axis, adjustable support means mounted by the frame adjacent one of the ends for positioning the rotational axis at a downward incline from the other of the ends to said one of the ends of the frame, a hopper mounted by the frame adjacent said other of the ends, means for controllably feeding material from the hopper to the tumbler above said rotational axis, means for agitating material below said rotational axis of the tumbler in response to rotation thereof, moisture sensing means mounted by the frame adjacent said one of the ends projecting into the tumbler for contact with the material being discharged therefrom, and means connecting the sensing means to the adjustable support means for changing the inclination of the rotational axis of the tumbler in response to variations in the moisture content of the material being discharged from the tumbler.

References Cited

UNITED STATES PATENTS

| | | | |
|---|---|---|---|
| 847,862 | 3/1907 | Warren | 34—142 |
| 1,408,456 | 3/1922 | Harrison | 34—169 |
| 1,530,949 | 3/1925 | Kipper | 23—1 |
| 1,916,900 | 7/1933 | Vandegrift et al. | 202—131 |
| 2,138,240 | 11/1938 | Kobusch | 259—3 |
| 2,798,444 | 7/1957 | Meakin | 18—12 |
| 2,727,809 | 12/1955 | Lust | 23—259.3 |
| 3,022,142 | 2/1962 | Sackett | 23—259.1 |
| 3,178,267 | 4/1965 | Larson | 23—259.1 |
| 3,372,488 | 3/1968 | Koch et al. | 34—46 |

JAMES H. TAYMAN, JR., *Primary Examiner.*

U.S. Cl. X.R.

23—260, 313; 34—46, 47, 48, 135, 166; 71—12, 21, 64; 259—3, 85